(12) United States Patent
Kitazato (10) Patent No.: US 10,397,633 B2
(45) Date of Patent: Aug. 27, 2019

(54) RECEIVER APPARATUS AND SYNCHRONIZATION PROCESSING METHOD THEREOF

(71) Applicant: Saturn Licensing LLC, New York, NY (US)

(72) Inventor: Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/400,612

(22) PCT Filed: Jun. 5, 2013

(86) PCT No.: PCT/JP2013/003527
§ 371 (c)(1),
(2) Date: Nov. 12, 2014

(87) PCT Pub. No.: WO2013/190789
PCT Pub. Date: Dec. 27, 2013

(65) Prior Publication Data
US 2015/0135247 A1    May 14, 2015

(30) Foreign Application Priority Data
Jun. 22, 2012  (JP) ................................. 2012-140938

(51) Int. Cl.
*H04N 7/173*  (2011.01)
*H04N 21/43*  (2011.01)
(Continued)

(52) U.S. Cl.
CPC ........ *H04N 21/4305* (2013.01); *H04H 20/18* (2013.01); *H04N 21/242* (2013.01);
(Continued)

(58) Field of Classification Search
None
See application file for complete search history.

(56) References Cited

U.S. PATENT DOCUMENTS 6,122,020 A * 9/2000 Abe .................... H04N 21/234
                                                 348/721
6,512,552 B1 * 1/2003 Subramanian .......... H04N 5/04
                                                 348/423.1
(Continued)

FOREIGN PATENT DOCUMENTS

EP        2200331 A2 *  6/2010  ......... H04N 13/0059
JP     2002281445 A  *  9/2002
(Continued)

OTHER PUBLICATIONS

U.S. Appl. No. 14/399,306, filed Nov. 6, 2014, Kitazato.
(Continued)

*Primary Examiner* — William J Kim
(74) *Attorney, Agent, or Firm* — Oblon, McClelland, Maier & Neustadt, L.L.P.

(57) ABSTRACT

A receiver apparatus includes: a broadcast receiver that receives a broadcast stream, a first time code being added to each first unit of first image data of the broadcast stream; a communication receiver that receives a communication stream via a network, a second time code being added to at least each first unit of second image data of the communication stream, the second image data being synchronized with the first image data and reproduced; a criterion time generator configured to generate criterion time; a time code processor configured to obtain the first time code added to the received broadcast stream and the second time code added to the communication stream at a predetermined timing, and to calculate an amount of delay of the second time code behind the first time code; and an adjuster (Continued)

configured to adjust the criterion time with reference to the amount of delay.

20 Claims, 9 Drawing Sheets

(51) Int. Cl.
      H04N 21/462     (2011.01)
      H04H 20/18      (2008.01)
      H04N 21/242     (2011.01)
      H04N 21/61      (2011.01)
      H04N 21/8547    (2011.01)

(52) U.S. Cl.
     CPC ..... H04N 21/4307 (2013.01); H04N 21/4622 (2013.01); H04N 21/6125 (2013.01); H04N 21/8547 (2013.01)

(56) References Cited

U.S. PATENT DOCUMENTS

| | | | |
|---|---|---|---|
| 6,587,505 B1* | 7/2003 | Nozawa | H04N 9/7921 375/240 |
| 7,353,166 B2* | 4/2008 | Li | H04N 5/44543 348/E5.105 |
| 8,931,024 B2 | 1/2015 | Kitazato et al. | |
| 2002/0103919 A1* | 8/2002 | Hannaway | H04N 21/23406 709/231 |
| 2005/0083437 A1* | 4/2005 | Uchida | H04N 21/2368 348/515 |
| 2005/0190872 A1* | 9/2005 | Seong | H04N 21/23608 375/354 |
| 2006/0070106 A1* | 3/2006 | Kitazato | H04N 9/8042 725/88 |
| 2006/0133515 A1* | 6/2006 | Mpr | H04N 21/4307 375/240.28 |
| 2006/0274214 A1* | 12/2006 | Carro | H04N 21/4113 348/722 |
| 2007/0003253 A1* | 1/2007 | Suzuki | H04N 21/2365 386/241 |
| 2007/0081562 A1* | 4/2007 | Ma | H04N 21/23406 370/516 |
| 2007/0092224 A1* | 4/2007 | Tsukagoshi | H04N 5/4401 386/202 |
| 2007/0297509 A1* | 12/2007 | Mizobuchi | H04N 5/44508 375/240.12 |
| 2010/0142927 A1* | 6/2010 | Lim | H04N 21/2368 386/239 |
| 2010/0325676 A1* | 12/2010 | Kim | H04N 21/238 725/105 |
| 2011/0043614 A1* | 2/2011 | Kitazato | H04N 13/0059 348/51 |
| 2011/0069223 A1 | 3/2011 | Nishikawa et al. | |
| 2012/0230389 A1* | 9/2012 | Laurent | H04N 21/235 375/240.01 |
| 2013/0088640 A1* | 4/2013 | Tobita | H04N 21/4307 348/512 |
| 2013/0089166 A1* | 4/2013 | Nakajima | H04N 21/4334 375/316 |
| 2013/0235270 A1* | 9/2013 | Sasaki | H04N 21/4622 348/564 |
| 2013/0279888 A1* | 10/2013 | Zeng | H04N 21/4307 386/357 |

FOREIGN PATENT DOCUMENTS

| | | | | |
|---|---|---|---|---|
| JP | 2005-159592 | A | 6/2005 | |
| JP | 2008-252831 | A | 10/2008 | |
| JP | 2009-10971 | A | 1/2009 | |
| JP | 2011-123195 | A | 6/2011 | |
| JP | 2011-166615 | A | 8/2011 | |
| JP | 2012-10009 | A | 1/2012 | |
| KR | 10-2012-0063431 | A | 6/2012 | |
| WO | WO 2011126240 | A2 * | 10/2011 | ......... H04N 21/2353 |
| WO | WO 201215175 | A1 * | 11/2012 | ......... H04N 21/4307 |

OTHER PUBLICATIONS

International Search Report dated Sep. 10, 2013 in PCT/JP2013/003527.

Extended European Search Report dated Oct. 7, 2015 in Patent Application No. 13806945.5.

Office Action issued in Japanese Patent Application No. 2014-520906 dated Jul. 11, 2017 with EnglishTranslation.

Matsumura, et al., "Implementation Study of an Extra Content Service for Broadcast Programs using Synchronized IP Streaming," *The institute of Image Information and Television Engineers*, 2 pages.

Matsumura, K. et al., "Hybridcast™ System and Technology Overview," Broadcast Technology No. 43, Winter 2011, pp. 6-11. (corresponding to reference AY on IDS filed Aug. 22, 2017).

* cited by examiner

Configuration of Picture Timing SEI

| pic_timing(payloadSize){ | C |
|---|---|
| If(pic_struct_present_flag){ | |
| pic_struct | 5 |
| for(i=0;i<NumClockTS;i++){ | |
| clock_timestamp_flag[i] | 5 |
| if(clock_timestamp_flag[i]){ | |
| full_timestamp_flag | 5 |
| n_frames | 5 |
| if(full_timestamp_flag){ | |
| seconds_value/*0..59*/ | 5 |
| minutes_value/*0..59*/ | 5 |
| hours_value/*0..23*/ | 5 |

RECEIVER APPARATUS AND SYNCHRONIZATION PROCESSING METHOD THEREOF

TECHNICAL FIELD

The present invention relates to: a receiver apparatus capable of receiving one of a plurality of images to be synchronized and reproduced by broadcasting, receiving the other via a network, and synchronizing and reproducing them; and a synchronization processing method thereof.

BACKGROUND ART

Wider frequency band for broadcasting may not be expected in the future in the face of growing demands for wider frequency band for communication such as mobile phones in recent years. Meanwhile, a larger frequency band is required to transmit content (e.g., 3D program, high-resolution image, etc.), and it is expected that the frequency for broadcasting will not be enough. In view of this, a service, which uses broadcasting and the Internet in an integrative manner and transmits a program requiring a wider frequency band such as a 3D program or a high-resolution image, is under consideration.

For example, Patent Document 1 discloses a technology including: transmitting main broadcast audio data as a broadcast wave; transmitting multi-viewpoint image data and multi-auditory point audio data via a network; and receiving and presenting, by a receiver apparatus, the main broadcast audio data, the multi-viewpoint image data, and the multi-auditory point audio data.

Patent Document 1: Japanese Patent Application Laid-open No. 2005-159592

SUMMARY OF INVENTION

Problem to be Solved by the Invention

When two image streams to be synchronized and reproduced are separately transmitted by broadcasting and by the Internet, if the receiving timing of one image stream is different from the receiving timing of the other image stream because of difference of characteristics of the transmitting methods, i.e., especially if a stream via the Internet is behind a broadcast stream and the buffer at the broadcast receiver side cannot absorb the amount of delay, it may be difficult to synchronize and reproduce those image streams.

In view of the above-mentioned circumstances, it is an object of the present technology to provide: a receiver apparatus capable of, when two image streams to be synchronized and reproduced are separately transmitted by broadcasting and by the Internet, successfully synchronizing and reproducing the two image streams; and a synchronization processing method thereof.

Means for Solving the Problem

To solve the above-mentioned problems, according to the present technology, a receiver apparatus includes: a broadcast receiver capable of receiving a first image stream by broadcasting, a first time code being added to each first unit of first image data of the first image stream; a communication receiver capable of receiving a second image stream via a network, a second time code being added to at least each first unit of second image data of the second image stream, the second image data being to be synchronized with the first image data and reproduced; a criterion time generator configured to generate criterion time, the criterion time being used to generate timing to execute process of presenting the first image data; a time code processor configured to obtain the first time code added to the received first image stream and the second time code added to the second image stream at predetermined timing, and to calculate an amount of delay of the second time code behind the first time code; and an adjuster configured to adjust the criterion time with reference to the amount of delay.

In the receiver apparatus, the time code processor is configured to obtain the first time code added to the received first image stream and the second time code added to the second image stream at predetermined timing, and to calculate an amount of delay of the second time code behind the first time code. The adjuster is configured to adjust the criterion time with reference to the amount of delay, the criterion time being used to generate timing to execute process of presenting the first image stream. As a result, it is possible to synchronize and reproduce the streams even if the communication stream is received after the broadcast stream.

Presentation time information may be added to the first image stream, the receiver apparatus may further include a first image decoder configured to decode the first image stream received by the broadcast receiver such that the first image stream is to be presented at the timing when the presentation time information added to the first image stream coincides with the criterion time, and a second image decoder configured to decode the second image stream received by the communication receiver, the time code processor may be configured to obtain the first time code added to each first unit of the first image stream to be decoded by the first image decoder, and to supply the first time code to the second image decoder, and the second image decoder may be configured to decode the first unit of the second image stream, the second time code same as the supplied first time code being added to the first unit.

The time code processor may be configured, at least when the communication stream is received for the first time when the broadcast stream is being received, to obtain the first time code added to the received first image stream and the second time code added to the second image stream, and to calculate an amount of delay of the second time code behind the first time code.

The adjuster may be configured to adjust the criterion time based on time data, the time data being obtained by adding a predetermined margin to the amount of delay.

The criterion time generator may be configured to generate the criterion time based on a time reference value added to the broadcast stream.

The first time code may be added to a front picture of each GOP of the first image stream, and the second time code may be added to each picture of the second image stream.

Moreover, according to the receiver apparatus of the present technology, presentation time information may be added to the second image stream, and the receiver apparatus may further include a first image decoder configured to decode the first image stream received by the broadcast receiver such that the first image stream is to be presented at the timing when the presentation time information added to the first image stream coincides with the criterion time, and a second image decoder configured to decode the second image stream received by the communication receiver such that the second image stream is to be presented at the timing when the presentation time information added to the second image stream coincides with the criterion time.

According to another aspect of the present technology, a synchronization processing method is characterized in that the method includes: receiving, by a broadcast receiver, a first image stream by broadcasting, a first time code being added to each first unit of first image data of the first image stream; receiving, by a communication receiver, a second image stream via a network, a second time code being added to at least each first unit of second image data of the second image stream, the second image data being to be synchronized with the first image data and reproduced; obtaining, by a time code processor, the first time code added to the received first image stream and the second time code added to the second image stream at predetermined timing, and calculating an amount of delay of the second time code behind the first time code; and adjusting, by an adjuster, a criterion time with reference to the amount of delay, the criterion time being used to generate timing to execute process of presenting the first image stream.

The synchronization processing method according to the present technology may further include: after the criterion time is adjusted, obtaining, by the time code processor, the first time code added to each first unit of the first image stream to be decoded by the first image decoder, and supplying the first time code to the second image decoder; and decoding, by the second image decoder, the first unit of the second image stream, the second time code same as the supplied first time code being added to the first unit.

The synchronization processing method according to the present technology may further include: after the criterion time is adjusted, decoding, by a first image decoder, the received first image stream such that the first image stream is to be presented at the timing when the presentation time information added to the first image stream coincides with the criterion time; and after the criterion time is adjusted, decoding, by a second image decoder, the received second image stream such that the second image stream is to be presented at the timing when the presentation time information added to the second image stream coincides with the criterion time.

Effect of the Invention

As described above, according to the present technology, it is possible to, when two image streams to be synchronized and reproduced are separately transmitted by broadcasting and by the Internet, successfully synchronize and reproduce the two image streams.

MODES FOR CARRYING OUT THE INVENTION

Hereinafter, embodiments of the present technology will be described.

First Embodiment

This embodiment relates to: a transmitter apparatus configured to transmit a stream (hereinafter referred to as "broadcast stream".) containing images transmitted by broadcasting, and a stream (hereinafter referred to as "communication stream".) containing images transmitted by the Internet; a receiver apparatus configured to receive the broadcast stream and the communication stream transmitted by the transmitter apparatus, and to synchronize and reproduce them; and its synchronization processing method.

Examples of such a system for synchronizing and transmitting a broadcast stream and a communication stream include the following.

1. 3D Program

Figure 1:
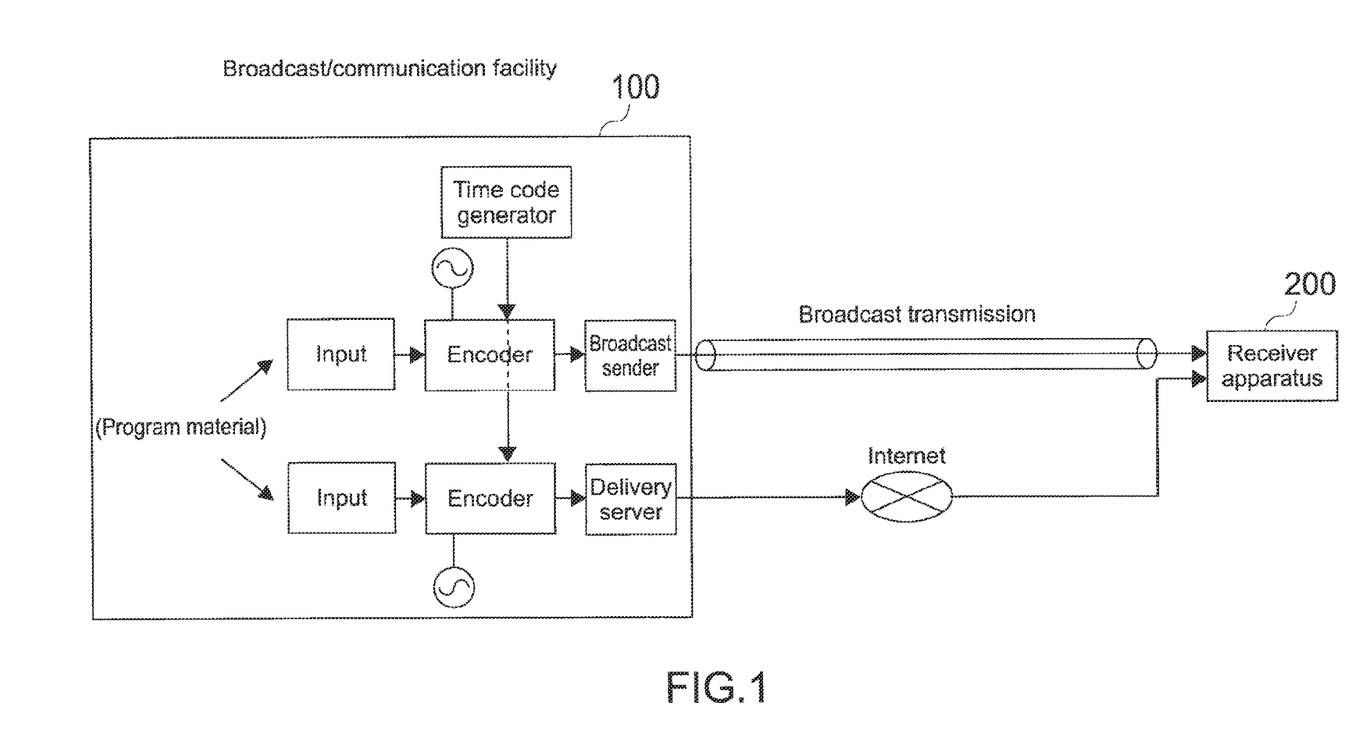
FIG. 1 A diagram showing the configuration of a system for synchronizing and transmitting a broadcast stream and a communication stream.

FIG. 1 is a diagram showing the configuration of a 3D program transmitting system.

The image from one viewpoint out of images from a plurality of viewpoints, which configure a 3D program, is transmitted by broadcasting, and the image from the other viewpoint is transmitted by communication. A receiver receives the two images transmitted by broadcasting and by communication, synchronizes, reproduces, and merges them, and presents a 3D image.

2. Multi-View Program

A plurality of cameras take images of one object simultaneously, an obtained image of one view, i.e., a main-view, is transmitted by broadcasting, and the other images of one or more views, i.e., sub-views, are transmitted by communication. A receiver receives those images of the plurality of views, and displays the main-view image in a main-window and displays the one or more sub-view images in sub-windows at the same time. Alternatively, the receiver alternately selects one of the main-view and the sub-views as an image displayed on a main-window.

3. High-Resolution Program

For example, an image taken by a high-resolution camera of 4K (number of pixels: 3940×2160) is divided in quarters, whereby four-block images each having a HD size (number of pixels: 1920×1080) are obtained. Some of them are transmitted by broadcasting, and the others are transmitted by communication. A receiver receives the four-block images each having a HD size, synchronizes, reproduces, and merges them, and presents a high-resolution image having a 4K size. Alternatively, an image taken by a high-resolution camera is frequency-resolved by wavelet transform or the like, an image having a HD size having low-resolution components is transmit by broadcasting, and the rest images having high-frequency components are transmitted by communication. A receiver frequency-synthesizes the received four images each having the HD size by wavelet inverse transform or the like, and reconstructs and presents one high-resolution image.

4. Dubbing Service

In a dubbing service, an image and the Japanese speech are transmitted by broadcasting, and multilingually-dubbed speech for that image is transmitted by communication. A receiver receives the image and the Japanese speech by broadcasting and receives the multilingually-dubbed speech of the image by communication at the same time, and synchronizes, reproduces, and presents the broadcast image and the dubbed-speech in response to a request from a user.

FIG. 1 is a diagram showing the configuration of the above-mentioned system for synchronizing and transmitting a broadcast stream and a communication stream.

Here, examples of a program material include a 3D program, a multi-view program, a high-resolution program, a dubbing service program, and the like. The broadcast/communication facility 100 divides a program material into a signal for broadcasting and a signal for communication. Each encoder encodes the signal for broadcasting or the signal for communication into a stream of MPEG2_TS or the like. Time codes, i.e., presentation time information, are inserted in each encoded stream. One stream in which the time codes are inserted is transmitted by broadcasting, and the other stream in which the time codes are inserted is delivered from a delivery server by communication via the Internet. Moreover, when encoding, a PCR (Program Clock Reference), i.e., a periodic time reference value, is inserted into each video TS packet. Alternatively, PCR packets each containing a PCR are added periodically.

Typically, a receiver apparatus 200 receives a broadcast stream and a communication stream of one program. Typically, the receiver apparatus 200 extracts PCRs from the received broadcast stream and PCRs from the communication stream, and sets up or calibrates the STC (System Time Clock), i.e., the criterion time of the receiver apparatus 200, based on the PCRs. The image presentation timing is generated based on the STC and PTSs (Presentation Time Stamps), i.e., presentation time information contained in image TS packets.

At this time, because of traffic changes of the network, the receiver apparatus 200 may receive a communication stream after a broadcast stream, which is to be synchronized with the communication stream and reproduced. If a communication stream is behind a broadcast stream, it is necessary to store a received broadcast stream in a buffer and to thus delay reproduction of the broadcast stream. However, typically, it is presupposed that the receiver apparatus 200 uniquely determines image stream presentation timing based on the STC, which is generated based on PCRs, and based on PTSs, i.e., time managing information of reproduction, in image TS packets. Because of this, actually, it is difficult to synchronize and reproduce a broadcast stream and a communication stream only by storing a received broadcast stream in a buffer.

In this embodiment, the STC of a receiver apparatus is adjusted and a broadcast stream and a communication stream are synchronized and reproduced based on the fact that each time code added to an image stream such as for example an MPEG2 video stream or an MPEG4-AVC video stream is data, which indicates the presentation time of a front picture of a GOP or each picture by units of hour, minute, second, and frame.

[Outline of Operation]

Figure 2:
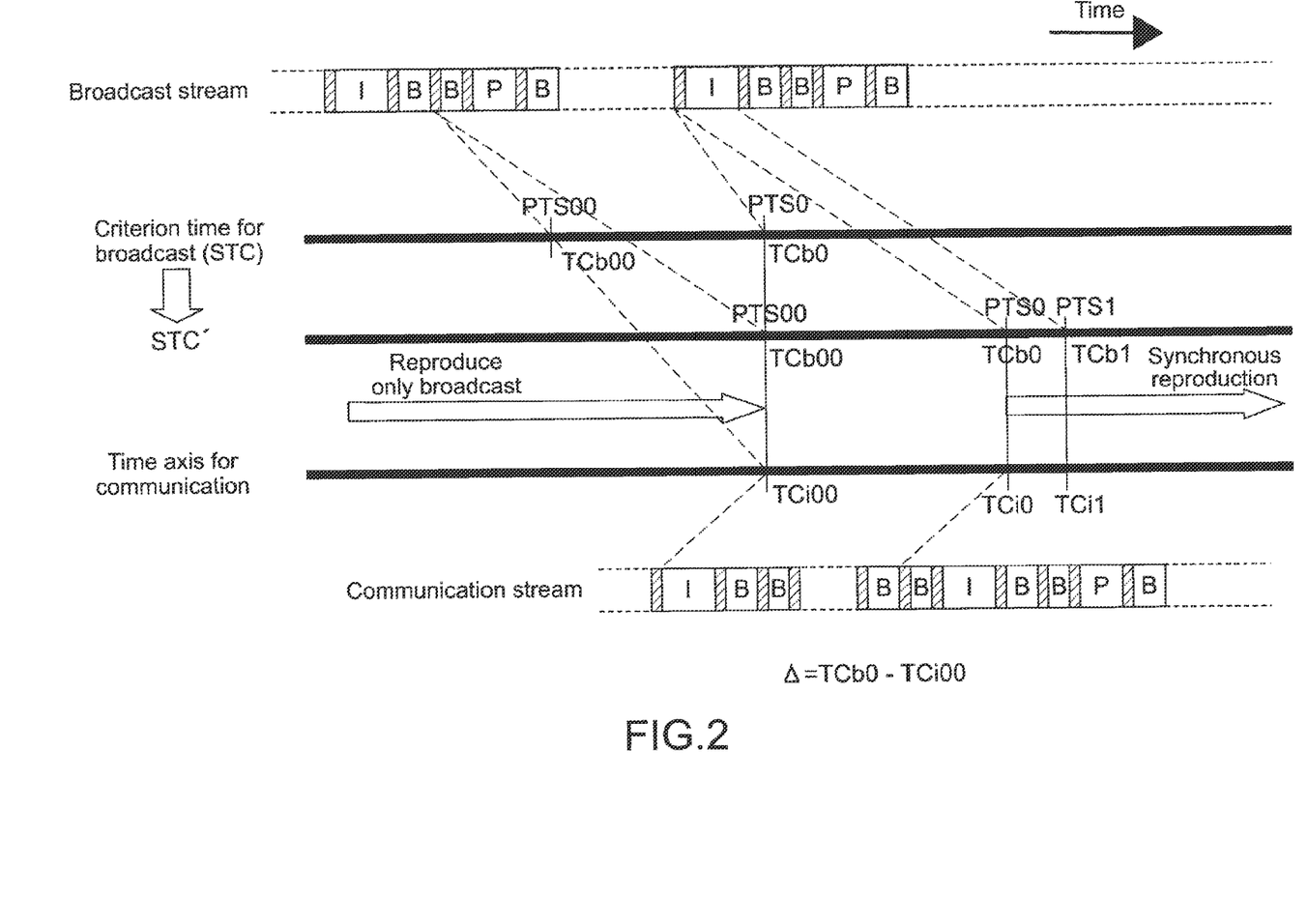
FIG. 2 A timing diagram showing the outline of an operation in which a receiver apparatus according to a first embodiment of the present technology adjusts the STC and thus synchronizes a broadcast stream and a communication stream.

FIG. 2 is a timing diagram showing the outline of an operation in which a receiver apparatus 300 according to a first embodiment of the present technology adjusts the STC and thus synchronizes a broadcast stream and a communication stream.

1. The receiver apparatus 300 compares the time code obtained from a broadcast stream to the time code obtained from a communication stream at a time when the receiver apparatus 300 receives a communication stream for the first time after an instruction to synchronize and reproduce a broadcast stream and a communication stream is generated. A time code obtained from a broadcast stream will be referred to as "first time code", and a time code obtained from a communication stream will be referred to as "second time code".

Here, the first time code of a broadcast stream at a time when the receiver apparatus 300 receives a communication stream for the first time after an instruction for synchronized reproduction is generated is referred to as "TCb0", the second time code of a communication stream received for the first time after the instruction for synchronized reproduction is generated is referred to as "TCi00", and it is determined if the condition TCb0>TCi00 is satisfied or not.

Note that, here, a time code is normally expressed by four values (TCh, TCm, TCs, and TCf), i.e., hour, minute, second, and frame. However, it is assumed that the above-mentioned TCb0 or TCi00 is obtained by converting the four values into one value (millisecond) based on the following formula.

TC=(TCh×60+TCm)×60+TCs)×1000+TCf×1000/60

2. If the above-mentioned condition is satisfied, the receiver apparatus 300 calculates the offset Δ of "TCb0" and "TCi00" based on the following formula.

$$TCb0 - TCi00 = \Delta \qquad (1)$$

3. The receiver apparatus 300 adjusts the STC based on the following formula, in which the offset Δ is used.

$$STC - \Delta \times 90 - m = STC' \qquad (2)$$

Here, the offset Δ is multiplied by 90 to thereby mapping between the offset Δ (millisecond) and a counter value of 90 KHz, which is same as the STC, is established. For example m is predetermined margin.

4. After the STC is adjusted, when the PTS in a TS packet of an image of a broadcast stream at a time when a communication stream is received for the first time coincides with the adjusted STC', the receiver apparatus 300 decodes a decoded-object and decodes an image data of a communication stream having a second time code (TCi0) same as the first time code (TCb0). After that, a broadcast stream and a communication stream are synchronized and reproduced again and again in the similar manner.

According to the above-mentioned process, it is possible to synchronize and reproduce a broadcast stream and a communication stream.

[Time Code]

Next, a time code of an MPEG2 (Moving Picture Experts Group phase 2) video stream will be described.

Figure 3:
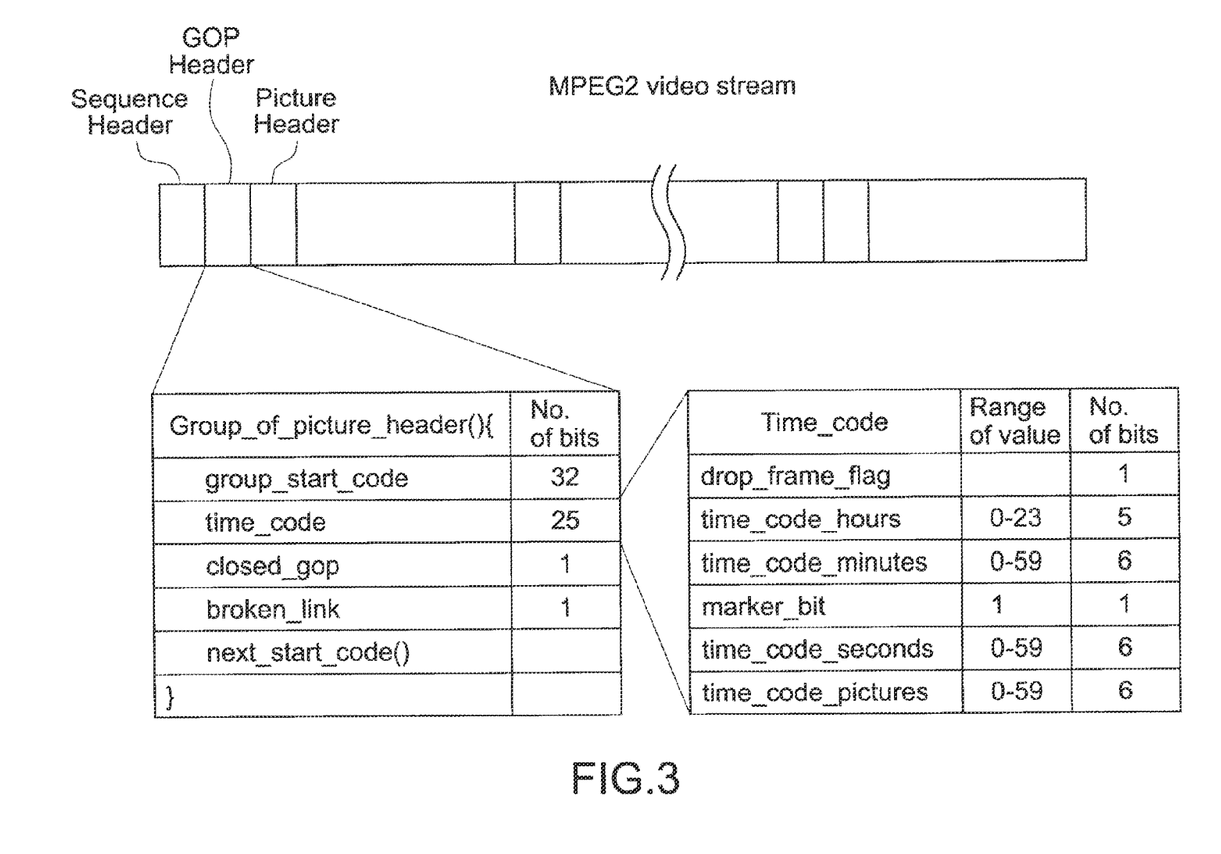
FIG. 3 A diagram illustrating a time code of an MPEG2 video stream.

FIG. 3 is a diagram illustrating a time code of an MPEG2 video stream.

Sequence_Header is described at the beginning of a picture layer, i.e., the uppermost layer.

Sequence_Header defines header data of an MPEG2 bit stream sequence. GOP_Header and Picture_Header are described after Sequence_Header.

GOP_Header defines header data of the GOP (group_of_picture) layer of an MPEG bit stream. The GOP_leader contains group_start_code, time_code, closed_gop, broken_link, and the like.

group_start_code is data showing a start synchronization code of a GOP layer.

time_code is a time code showing time from the front of a sequence of the front picture of a GOP. In other words, time_code is a time code added to each GOP (first unit).

closed_gop is flag data showing that it is possible to reproduce an image in a GOP independent of other GOPs.

broken_link is flag data showing that it is not possible to reproduce the front B picture in a GOP accurately because of editing or the like.

Moreover, time_code contains hour, minute, second, and frame (picture) data showing the presentation time of the front picture of a GOP, and other data.

Figure 4:
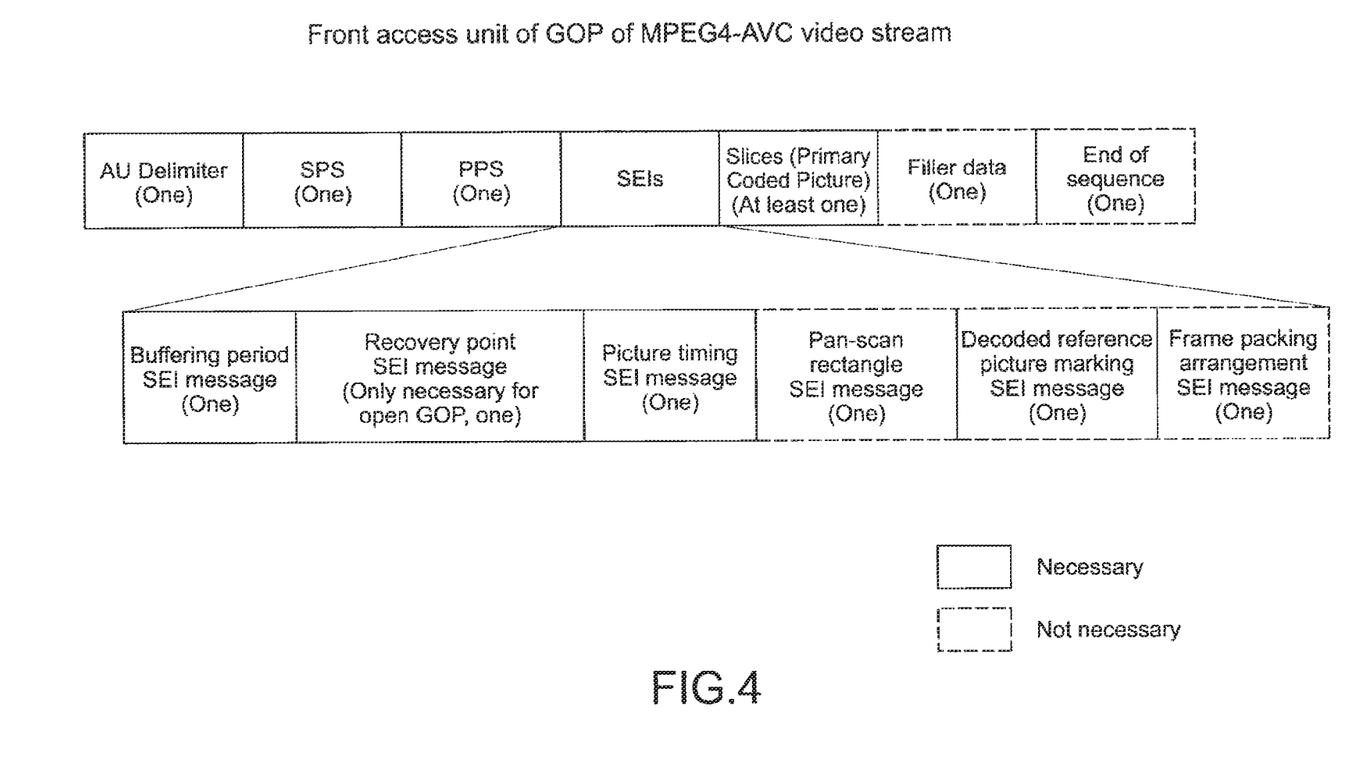
FIG. 4 A diagram showing the configuration of the front access unit of a GOP of an MPEG4-AVC (Advanced Video Coding) video stream.

FIG. 4 is a diagram showing the configuration of the front access unit of a GOP of an MPEG4-AVC (Advanced Video Coding) video stream.

AU delimiter is information showing the boundary position of a picture.

SPS (Sequence Parameter Set) is a parameter of a video sequence. Specifically, SPS contains a buffer size (picture or slice) of a virtual buffer, and bit rate information.

PPS (Picture Parameter Set) is a parameter of the picture.

SEIs (Supplemental Enhancement Information) are additional information containing auxiliary information on decoding.

Slices are data of one picture in an access unit.

SEI contains Picture timing SEI. Picture timing SEI is timing information showing decoding and display timing of a Slice (picture data).

Figure 5:
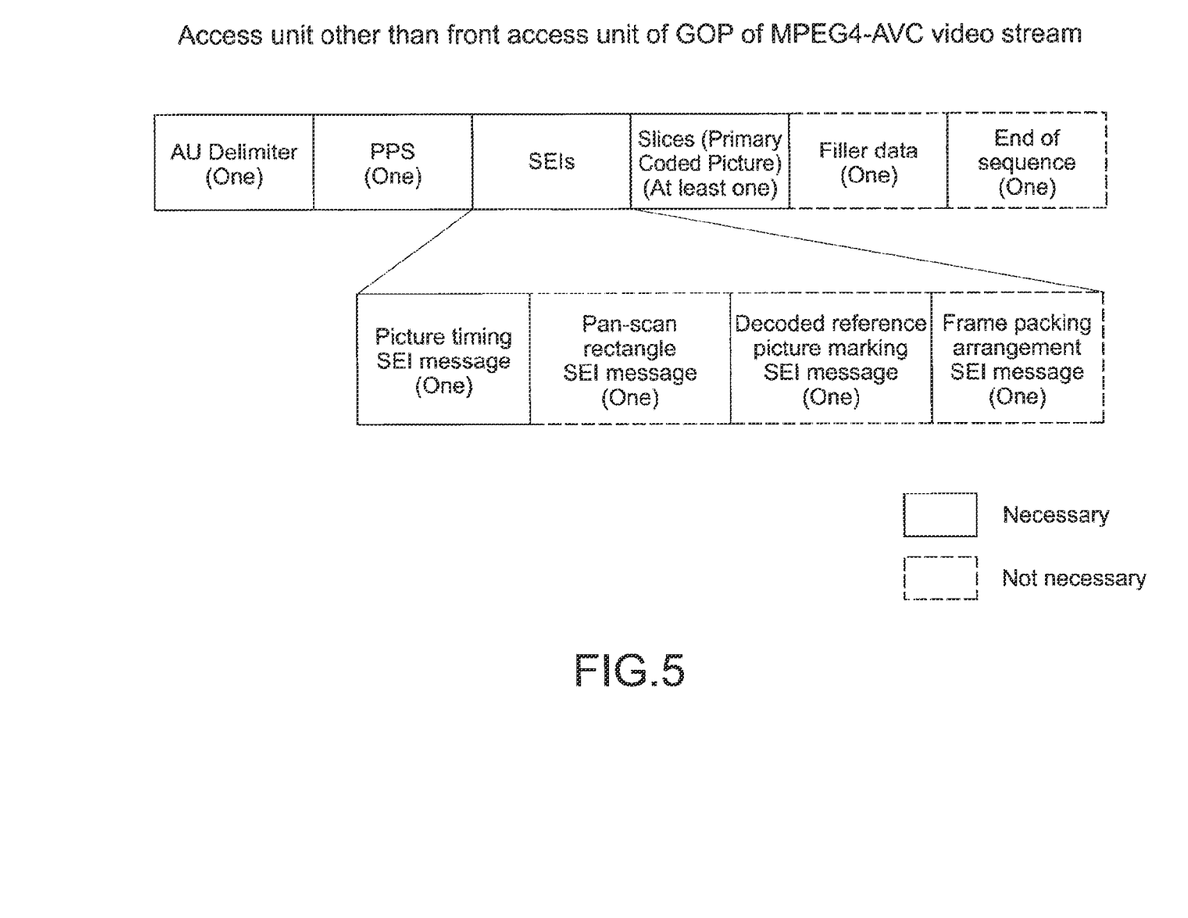
FIG. 5 A diagram showing the configuration of an access unit other than the front access unit of a GOP of an MPEG4-AVC video stream.

FIG. 5 is a diagram showing the configuration of an access unit other than the front access unit of a GOP of an MPEG4-AVC video stream.

An access unit other than the front of a GOP contains AU delimiter, PPS, SEIs, and Slices. Moreover, SEIs contain Picture timing SEI similar to the access unit of the front of a GOP.

Figure 6:
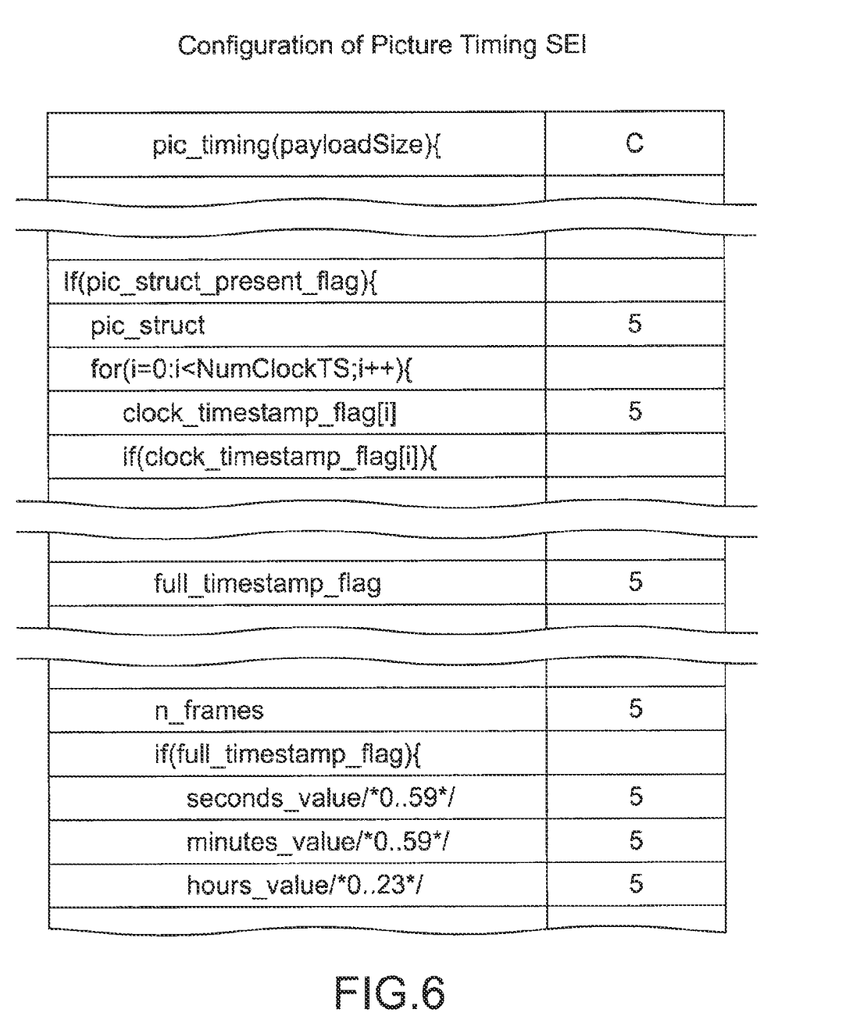
FIG. 6 A diagram showing the configuration of Picture Timing SEI of FIG. 4 and FIG. 5.

FIG. 6 is a diagram showing the configuration of Picture Timing SEI. Picture Timing SEI describes hour, minute, second, and frame (n_frame) data. In other words, in an MPEG4-AVC video stream, Picture Timing SEI is a time code showing the presentation time of each picture. In other words, Picture Timing SEI is a time code at least added to each GOP.

In general, an MPEG2 video stream is used to transmit an image by broadcasting, and an MPEG4-AVC video stream is used to transmit an image by the Internet (communication). Because of this, in this case, time_code of an MPEG2 video stream is used as a first time code, and Picture timing SEI of an MPEG4-AVC video stream is used as a second time code.

[Configuration of Receiver Apparatus]

Figure 7:
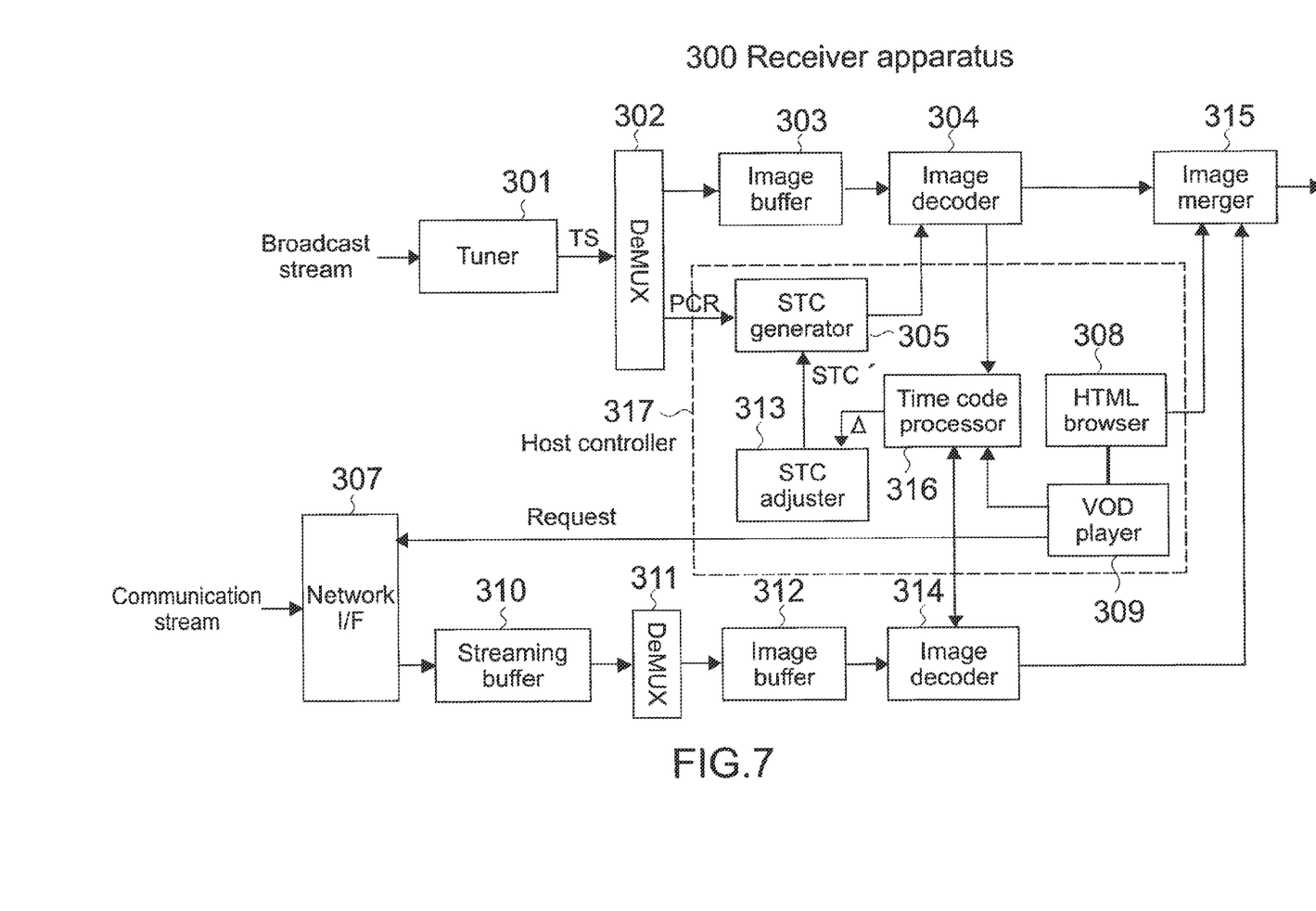
FIG. 7 a block diagram showing the configuration of a receiver apparatus of the first embodiment.

FIG. 7 is a block diagram showing the configuration of the receiver apparatus 300 of this embodiment.

The receiver apparatus 300 includes a tuner 301 (broadcast receiver), a broadcast DeMUX 302, a broadcast image buffer 303, a broadcast image decoder 304 (first image decoder), an STC generator 305 (criterion time generator), a network I/F 307 (communication receiver), an HTML browser 308, a VOD player 309, a communication streaming buffer 310, a communication DeMUX 311, a communication image buffer 312, an STC adjuster 313 (adjuster), a communication image decoder 314 (second image decoder), an image merger 315, and a time code processor 316.

The tuner 301 receives a broadcast stream (first image stream) of a channel selected by a user, generates a transport stream (TS), and transmits the transport stream to the broadcast DeMUX 302.

The broadcast DeMUX 302 demultiplexes the transport stream, separates image TS packets therefrom, supplies the image TS packets to the broadcast image buffer 303 as an image stream, extracts PCRs from the image TS packets, and supplies the PCRs to the STC generator 305.

The broadcast image buffer 303 buffers the image stream to be supplied to the broadcast image decoder 304.

The broadcast image decoder 304 decodes the image stream read from the broadcast image buffer 303, and outputs an image signal to the image merger 315 based on the time of the STC from the STC generator 305. More specifically, the broadcast image decoder 304 controls decoding-start timing and output timing such that the image is to be presented at times when PTSs (Presentation Time Stamps) added to image TS packets coincide with the STC values.

Moreover, the broadcast image decoder 304 constantly supplies time codes (first time codes) added to an image stream to be decoded to the time code processor 316 in order to synchronize and reproduce broadcasting and communication.

The STC generator 305 generates an STC of 27 MHz with reference to the PCRs extracted from a broadcast stream, and supplies the STC to the broadcast image decoder 304 and the like. The STC generator 305 is capable of adjusting the STC based on data-to-adjust-STC from the STC adjuster 313.

Broadcast-related application software, which is operated by an HTML (HyperText Markup Language) browser 308, outputs an instruction to synchronize and reproduce a broadcast stream and a communication stream to the VOD (Video On Demand) player 309, whereby the VOD player 309 supplies a request to obtain a communication stream to the network I/F 307. The network I/F 307 sends the request to a delivery server of the broadcast/communication facility 100 via the Internet, and receives a communication stream (second image stream), which is to be synchronized with a broadcast stream and reproduced, as a response from the delivery server.

The communication streaming buffer 310 buffers the received communication stream. The communication streaming buffer 310 retrieves the stored communication stream, and supplies the communication stream to the communication DeMUX 311.

The communication DeMUX 311 separates image TS packets from a communication stream retrieved from the streaming buffer 310, and supplies the image TS packets to the communication image buffer 312 as an image stream.

The communication image buffer 312 buffers the image stream to be supplied to the communication image decoder 314.

The communication image decoder 314 decodes the image stream retrieved from the communication image buffer 312, and supplies a communication-related image signal to the image merger 315.

Moreover, in order to adjust the STC, the communication image decoder 314 supplies, to the time code processor 316, a time code (second time code) in image data obtained for the first time after an instruction to synchronize and reproduce a broadcast stream and a communication stream is generated.

Moreover, after the STC is adjusted, the communication image decoder 314 retrieves an image data unit of a communication stream having a second time code, which is the same as the first time code value supplied from the time code processor, from the communication image buffer 312, decodes the image data unit, and outputs the image data unit to the image merger 315 as a communication-related image signal.

The image merger 315 merges the broadcast-related image signal and the communication-related image signal, generates an image signal to be presented, and outputs the image signal to a not-shown display. Here, the image signals are merged based on a method corresponding to a method of separating a program material (3D program, multi-view program, high-resolution program, dubbing service program, etc.) into broadcasting and communication.

The time code processor 316 compares the second time code, which is supplied from the communication image decoder 314 for the first time after an instruction to synchronize and reproduce a broadcast stream and a communication stream is generated, to the latest first time code supplied from the broadcast image decoder 304. If the second time code is behind the first time code, the time code processor 316 supplies the difference to the STC adjuster 313.

After the STC is adjusted, the time cede processor 316 supplies the first time code, which is supplied from the broadcast image decoder 304, to the communication image decoder 314 in order to synchronize and reproduce a broadcast stream and a communication stream.

A host controller 317 includes a CPU (Central Processing Unit), a RON (Read Only Memory), a RAM (Random Access Memory), and the like. The RON fixedly stores programs executed by the CPU and data. The programs stored in the ROM are loaded in the RAM, and the CPU executes the loaded programs.

The programs loaded in the RAM cause the host controller 317 to operate as at least the STC generator 305, the HTML browser 308, the VOD player 309, the time code processor 316, and the STC adjuster 313. The host controller 317 is capable of receiving various kinds of instructions and data input by a user by using a not-shown remote control, for example. Note that the STC generator 305, the time code processor 316, and the STC adjuster 313 may not be software but may be hardware.

[Processing of Synchronizing Broadcast Stream and Communication Stream]

Next, operations from selection of a broadcast channel to synchronized reproduction of a broadcast stream and a communication stream, which are performed by the receiver apparatus 300, will be described.

Firstly, a user of the receiver apparatus 300 selects a broadcast channel by using a not-shown remote control or the like. The host controller 317 processes selected-channel information, which is input by the user and received by the remote control or the like. The host controller 317 controls the tuner 301 based on the selected-channel information input by the user.

The tuner 301 transmits a broadcast stream of the received channel to the broadcast DeMUX 302. The DeMUX 302 separates image TS packets, audio TS packets, and the other TS packets such as SI (Service Information: program array information) from the broadcast stream. The broadcast DeMUX 302 supplies the separated image TS packets, i.e., an image stream, to the broadcast image buffer 303. The broadcast image buffer 303 temporarily stores the image stream.

Moreover, the broadcast DeMUX 302 constantly extracts PCRs from the image TS packets, and supplies the PCRs to the STC generator 305. The STC generator 305 generates a STC (System Time Clock) of 21 MHz with reference to the PCRs.

The broadcast image decoder 304 decodes the image stream read from the broadcast image buffer 303, and supplies an image signal to the image merger 315. At this time, the broadcast image decoder 304 controls decoding-and-output timing of the image stream such that the image is to be presented at times when the PTSs (Program Clock Reference) of the image TS packets coincide with the STC from the STC generator 305. Moreover, the broadcast image decoder 304 supplies the time codes, which are added to the image stream to be decoded, to the time code processor 316 in order to synchronize and reproduce the broadcast stream and a communication stream.

As an example of this operation, it is presupposed that, after a channel is selected, the receiver apparatus 300 obtains application software (broadcast-related application software) related to the channel or a program by broadcasting or communication, and executes the application software. The broadcast-related application software causes the receiver apparatus 300 to: allow a user to watch, for example, a 3D program, a multi-view program, a high-resolution program, a dubbing service program, or the like, in which a broadcast stream and a communication stream are synchronized and reproduced; receive a watch-instruction (instruction to synchronize and reproduce broadcast stream and communication stream) from a user; and then cause the VOD player 309 to send a request to obtain a communication stream from a delivery server.

Note that the broadcast-related application software includes, for example, HTML (Hyper Text Markup Language) documents, BML documents (Broadcast Markup Language), MHEG documents (Multimedia and Hypermedia information coding), Java (registered trademark) scripts, still-image files, moving-image files, and the like.

If the VOD player 309 receives the instruction to synchronize and reproduce a broadcast stream and a communication stream, the VOD player 309 causes the network I/F 307 to send a request to transmit a communication stream (communication stream to be synchronized with broadcast stream and reproduced) related to the selected channel or a program to a delivery server via the Internet, and supplies an instruction to generate an offset Δ to the time code processor 316. If the time code processor 316 receives the instruction, the time code processor 316 waits for a first time code to be supplied from the communication image decoder 314.

Meanwhile, the communication streaming buffer 310 stores a communication stream transmitted from the delivery server via the network I/F 307 in response to the request. Here, the communication streaming buffer 310 stores the front image TS packet of the communication stream, reads the front image TS packet immediately after that, and supplies the front image TS packet to the communication DeMUX 311.

The communication DeMUX 311 separates image TS packets from the communication stream read from the streaming buffer 310, and supplies the image TS packets to the communication image buffer 312.

The communication image decoder 314 decodes the image stream read from the communication image buffer 312, and supplies an image signal to the image merger 315. At this time, the communication image decoder 314 supplies a second time code of the image stream to the time code processor 316 as the latest second time code after an instruction to synchronize and reproduce a broadcast stream and a communication stream is generated.

Here, the latest second time code supplied from the communication image decoder 314 is TCi00, and the first time code supplied from the broadcast image decoder 304 at the same time as the above-mentioned second time code is TCb0. The time code processor 316 compares TCi00 to TCb0, and determines if the condition TCb0>TCi00 is satisfied or not. If TCb0>TCi00 is satisfied, then it means that the image data of the communication stream is actually received after image data of a broadcast stream, the communication stream being to be synchronized with the broadcast stream and reproduced.

If the condition TCb0>TCi00 is satisfied, the time code processor 316 calculates the offset d of TCb0 and TCi00 based on the following formula.

$$TCb0-TCi00=\Delta \quad (1)$$

The value of the offset $\Delta$ is supplied to the STC adjuster 313.

Specifically, each of the first time code and the second time code is expressed by the combination of hour, minute, second, and frame. So the offset $\Delta$ (millisecond) is obtained based on the following formula.

$$\Delta=((TCbh\times60+TCbm)\times60+TCbs)\times1000+TCbf\times1000/60-((TCih\times60+TCim)\times60+TCis)\times1000+TCif\times1000/60$$

Here, TCbh is a time code (hour) or broadcasting, TCbm is a time code (minute) of broadcasting, TCbs is a time code (second) of broadcasting, and TCbf is a time code (frame) of broadcasting. TCih is a time code (hour) of broadcasting, TCim is a time code (minute) of communication, TCis is a time code (second) of communication, and TCif is a time code (frame) of communication.

The STC adjuster 313 receives the offset $\Delta$, and then generates an adjusted value of the STC, i.e., STC', based on the following formula.

$$STC-\Delta\times90-m=STC' \quad (2)$$

Here, the offset $\Delta$ is multiplied by 90 to thereby mapping between the offset $\Delta$ (millisecond) and a counter value of 90 KHz, which is same as the STC, is established. m is predetermined margin.

The STC' generated as described above is supplied to the STC generator 305, and the STC generator 305 resets the STC', whereby the STC is adjusted.

Next, the operation of synchronizing and reproducing a broadcast stream and a communication stream based on the adjusted STC' will be described.

The broadcast image decoder 304 extracts the first time code added to the image stream to be decoded, supplies the first time code to the time code processor 316, decodes the image stream, and supplies an image signal to the image merger 315.

When a PTS of an image TS packet of a broadcast stream coincides with the STC', the receiver apparatus 300 restarts decoding and reproducing the broadcast stream. Moreover, the communication image decoder 314 retrieves an image data unit of an image stream, whose second time code (TCi0) is the same as the first time code (TCb0) obtained from the time code processor 316, from the communication image buffer 312, and decodes the image data unit. The communication image decoder 314 obtains an image signal, and supplies the image signal to the image merger 315. As a result, the synchronized broadcast-related image signal and communication-related image signal are supplied to the image merger 315.

Because the synchronized broadcast-related image signal and communication-related image signal are supplied to the image merger 315, an original program such as a 3D program, a multi-view program, a high-resolution program, or a dubbing service program is reconstructed accurately.

Note that if the condition TCb0>TCi00 is satisfied, the STC is adjusted. If TCb0<TCi00 or TCb0=TCi00 is satisfied, it is not necessary to adjust adjust the STC.

Moreover, the adjusted STC' is corrected to the original STC simultaneously with the end of the broadcast program decoded based on the STC'.

Figure 8:
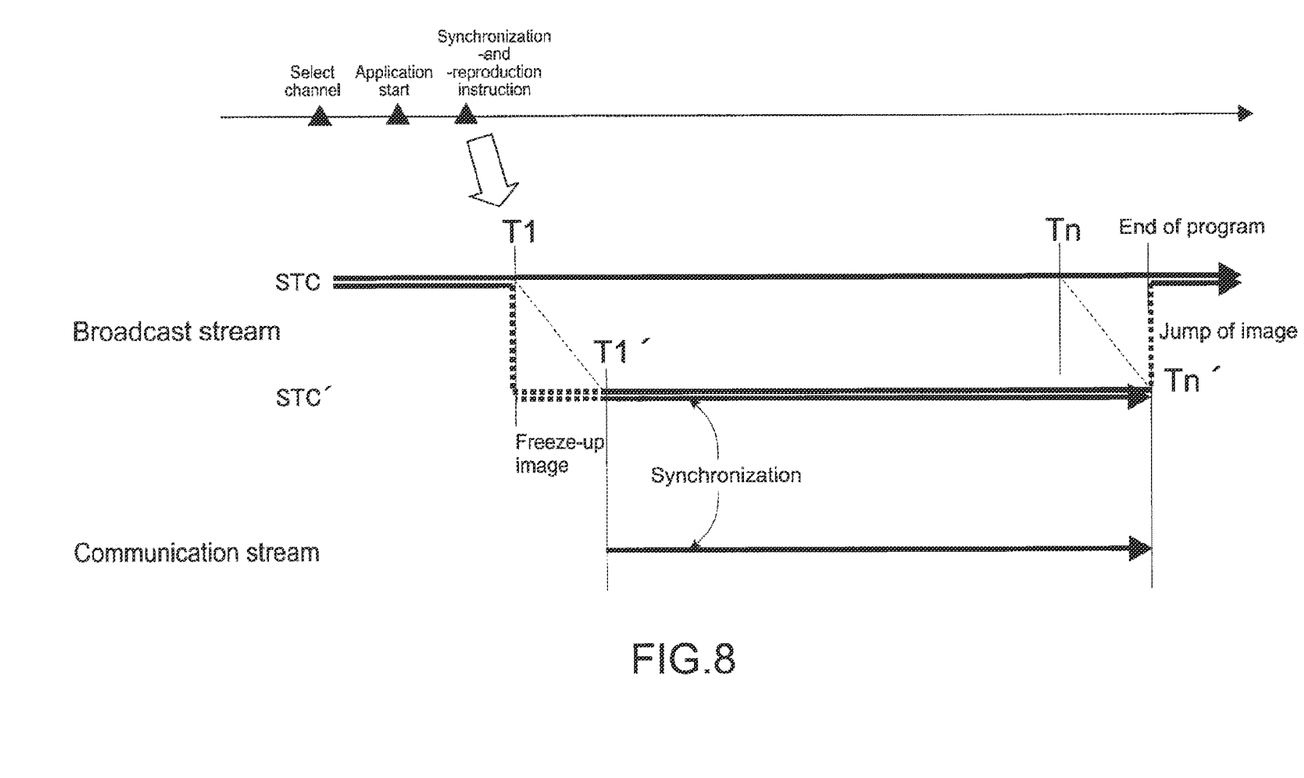
FIG. 8 A timing diagram showing firstly selection of a broadcast channel, processing of synchronizing a broadcast stream and a communication stream, and finally the end of the synchronization processing, which are performed by the receiver apparatus of the first embodiment.

FIG. 8 is a timing diagram showing firstly selection of a broadcast channel, processing of synchronizing a broadcast stream and a communication stream, and finally the end of the synchronization processing, which have been described above.

The receiver apparatus 300 updates the STC with the STC'. As a result, the time T1 to start decoding an image stream is delayed, and the time T1' is set. A freeze-up image is displayed between T1 and T1'. Then decoding of a broadcast image stream and a communication image stream is restarted at the time T1'. After that, decoding is performed with reference to the STC' until the end of the program. When the program is finished, the STC is used again instead of the STC', an access unit whose PTS coincides with the STC is selected, and decoding is performed.

Second Embodiment

In the above-mentioned first embodiment, the broadcast image decoder 304 constantly supplies first time codes added to an image stream to be decoded to the time code processor 316. After the STC is adjusted, the time code processor 316 supplies a first time code, which is supplied from the broadcast image decoder 304, to the communication image decoder 314 in order to synchronize and reproduce a broadcast stream and a communication stream. Then the communication image decoder 314 retrieves an image data unit of a communication stream, whose second time code is the same as the first time code supplied from the time code processor 316, from the communication image buffer 312, and decodes the image data unit.

The present technology is not limited to this. Alternatively, after the STC is adjusted, a broadcast image decoder may control decoding-start timing and output timing such that the image is to be presented at times when PTSs (Presentation Time Stamps) added to image TS packets coincide with the adjusted STC', and a communication image decoder may control decoding-start timing and output timing such that the image is to be presented at times when PTSs (Presentation Time Stamps) added to image TS packets coincide with the adjusted STC'.

Figure 9:
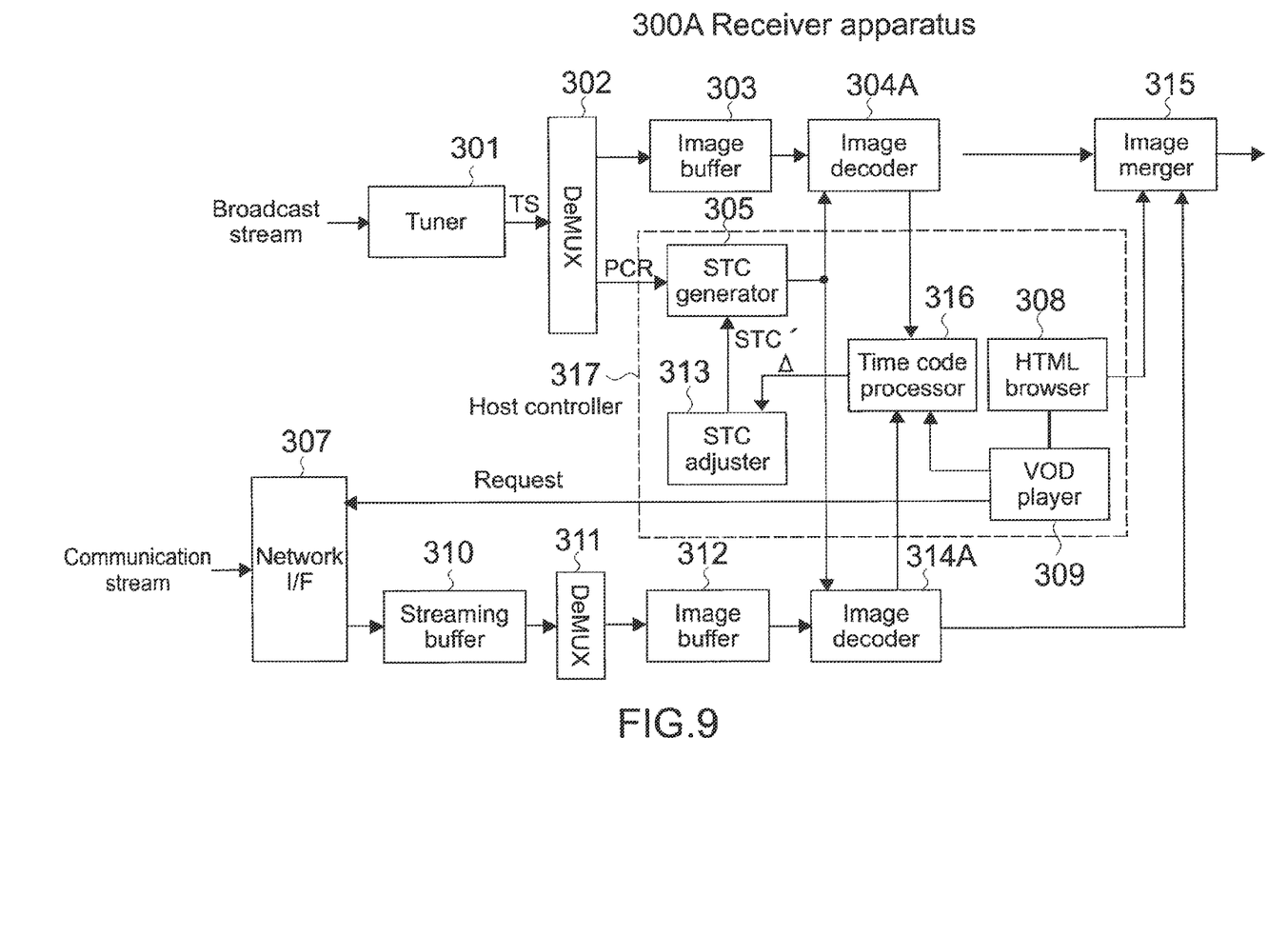
FIG. 9 A block diagram showing the configuration of a receiver apparatus according to a second embodiment.

FIG. 9 is a block diagram showing the configuration of a receiver apparatus 300A according to a second embodiment.

Similar to the first embodiment, the time code processor 316 of the receiver apparatus 300A compares the second time code, which is supplied from the communication image decoder 314A for the first time after an instruction to synchronize and reproduce a broadcast stream and a communication stream is generated, to the latest first time code supplied from the broadcast image decoder 304A. If the second time code is behind the first time code, the time code processor 316 supplies the offset $\Delta$ to the STC adjuster 313.

The STC adjuster 313 receives the offset $\Delta$, and then generates an adjusted value of the STC, i.e., STC'. The STC adjuster 313 supplies the adjusted STC' to the STC generator 305, whereby the STC of the STC generator 305 is adjusted.

After the STC is adjusted, the broadcast image decoder 304A controls decoding-start timing and output timing such that the image is to be presented at times when PTSs (Presentation Time Stamps) added to image broadcast TS packets coincide with the adjusted STC' values.

Meanwhile, similarly, the communication image decoder 314A controls decoding-start timing and output timing such that the image is to be presented at times when PTSs added to communication broadcast TS packets coincide with the adjusted STC' values.

As a result, the receiver apparatus 300A of this embodiment is also capable of synchronizing and reproducing those streams successfully even if a communication stream is received after a broadcast stream.

Modification Example 1

In the above-mentioned first embodiment, the STC is adjusted once before synchronized reproduction of a broadcast stream and a communication stream is started. Alternatively, the STC may also be adjusted after the synchronized reproduction is started.

Examples of conditions of adjusting the STC after the synchronized reproduction is started include 1. at a constant frequency (every several minutes, every several tens of minutes), 2. if the size of an image stream stored in the streaming buffer 310 decreases below a predetermined value, 3. if the size of an image stream stored in the communication image buffer 312 decreases below a predetermined value, and the like.

Note that because adjustment of the STC leads to a freeze-up image, it is not preferable to adjust the STC too frequently. However, if the STC is adjusted only once at the beginning, reception of a communication stream may be delayed depending on the communication status of the Internet. In view of this, adjustment of the STC also after the synchronized reproduction is started as described above is beneficial especially for a synchronous transmitting system such as a 3D image system in which reproduction of a program itself is failed if one of a broadcast-stream image and a communication-stream image is absent.

The margin m, which is used to calculate the offset Δ, may be variable depending on a receiving status of a communication stream or the like. In other words, if a margin is too large, a freeze-up broadcast stream is displayed for a long time, and a viewer is likely to feel something wrong. To the contrary, if a margin is too small, reproduction of a 3D program or the like is likely to be failed because a communication stream is absent. In view of this, it is desirable that a requisite minimum margin be dynamically set up such that reproduction of a program is not failed depending on a receiving status of a communication stream.

In the above-mentioned embodiments, an MPEG2 video stream is used to transmit an image by broadcasting, and an MPEG4-AVC video stream is used to transmit an image by the Internet (communication). The present technology is not limited to this. For example, an MPEG2 video stream may be used to transmit an image by broadcasting and to transmit an image by communication. An MPEG4-AVC video stream may be used to transmit an image by broadcasting and to transmit an image by communication.

Moreover, the present technology may use a video stream other than the MPEG2 video stream and the MPEG4-AVC video stream as long as a time code is added to each predetermined unit of image data.

The present technology is not limited to the above-mentioned illustrated examples, and may be variously modified within the gist of the present invention, as a matter of course.

Note that the present technology may employ the following configurations.

(1) A receiver apparatus, including:

a broadcast receiver capable of receiving a first image stream by broadcasting, a first time code being added to each first unit of first image data of the first image stream;

a communication receiver capable of receiving a second image stream via a network, a second time code being added to at least each first unit of second image data of the second image stream, the second image data being to be synchronized with the first image data and reproduced;

a criterion time generator configured to generate criterion time, the criterion time being used to generate timing to execute process of presenting the first image data;

a time code processor configured to obtain the first time code added to the received first image stream and the second time code added to the second image stream at predetermined timing, and to calculate an amount of delay of the second time code behind the first time code; and an adjuster configured to adjust the criterion time with reference to the amount of delay.

(2) The receiver apparatus according to (1), in which

The receiver apparatus according to claim 1, in which presentation time information is added to the first image stream, the receiver apparatus further comprises a first image decoder configured to decode the first image stream received by the broadcast receiver such that the first image stream is to be presented at the timing when the presentation time information added to the first image stream coincides with the criterion time, and a second image decoder configured to decode the second image stream received by the communication receiver, the time code processor is configured to obtain the first time code added to each first unit of the first image stream to be decoded by the first image decoder, and to supply the first time code to the second image decoder, and the second image decoder is configured to decode the first unit of the second image stream, the second time code same as the supplied first time code being added to the first unit.

(3) The receiver apparatus according to (1) or (2), in which the time code processor is configured, at least when the communication stream is received for the first time when the broadcast stream is being received, to obtain the first time code added to the received first image stream and the second time code added to the second image stream, and to calculate an amount of delay of the second time code behind the first time code.

(4) The receiver apparatus according to any one of (1) to (3), in which the adjuster is configured to adjust the criterion time based on time data, the time data being obtained by adding a predetermined margin to the amount of delay.

(5) The receiver apparatus according to any one of (1) to (4), in which the criterion time generator is configured to generate the criterion time based on a time reference value added to the broadcast stream.

(6) The receiver apparatus according to any one of (1) to (5), in which the first time code is added to a front picture of each GOP of the first image stream, and the second time code is added to each picture of the second image stream.

(7) The receiver apparatus according to (1), in which presentation time information is added to the second image stream, and the receiver apparatus further comprises a first image decoder configured to decode the first image stream received by the broadcast receiver such that the first image stream is to be presented at the timing when the presentation tire information added to the first image stream coincides with the criterion time, and a second image decoder configured to decode the second image stream received by the communication receiver such that the second image stream is to be presented at the timing when the presentation time information added to the second image stream coincides with the criterion time.

(8) The receiver apparatus according to (7), in which the adjuster is configured to adjust the criterion time based on time data, the time data being obtained by adding a predetermined margin to the amount of delay.

(9) The receiver apparatus according to (7) or (8), in which the criterion time generator is configured to generate the criterion time based on a time reference value added to the broadcast stream.

(10) The receiver apparatus according to any one of (7) to (9), in which the criterion time generator is configured to generate the criterion time based on a time reference value added to the broadcast stream.

(11) The receiver apparatus according to any one of (7) to (10), in which the first time code is added to a front picture of each GOP of the first image stream, and the second time code is added to each picture of the second image stream.

DESCRIPTION OF REFERENCE NUMERALS 100 broadcast/communication facility
300 receiver apparatus
301 tuner
302 broadcast DeMUX
303 broadcast image buffer
304 broadcast image decoder
305 STC generator
307 network I/F
308 HTML browser
309 VOD player
310 streaming buffer
311 communication DeMUX
312 communication image buffer
313 STC adjuster
314 communication image decoder
315 image merger
316 time code processor
317 host controller

The invention claimed is:
1. A receiver apparatus, comprising:
circuitry configured to:
generate criterion time;
receive a first image stream from a broadcast transmission, a first time code comprised in each first unit of the first image stream and decode the first image stream based on the generated criterion time;
obtain an instruction to synchronize the first image stream with a second image stream received via a network, a second time code being comprised in at least each first unit of the second image stream;
upon obtaining the instruction to synchronize, obtain a first time code received in the received first image stream after the instruction to synchronize is obtained and a second time code received in the second image stream after the instruction to synchronize is obtained, and calculate an amount of delay of the obtained corresponding second time code behind the obtained first time code;
adjust the criterion time based on the amount of delay; and
pause decoding of the first image stream when the instruction to synchronize is obtained until the adjusted criterion time is reached and, when the adjusted criterion time is reached, resume decoding the first image stream and begin decoding the second image stream in synchronization with the first image stream, wherein
the obtained first time code is a chronologically first time code included in the first image stream after the instruction to synchronize is obtained, and
the obtained second time code is a chronologically first time code included in the second image stream after the instruction to synchronize is obtained.

2. The receiver apparatus according to claim 1, wherein presentation time information is comprised in the first image stream, and
the circuitry is further configured to:
decode the first image stream such that the first image stream is to be presented at a timing when the presentation time information comprised in the first image stream coincides with the adjusted criterion time,
decode the second image stream,
supply the obtained first time code, and
decode a first unit of the second image stream, the obtained second time code being the same as the supplied first time code.

3. The receiver apparatus according to claim 2, wherein the circuitry is configured to perform the obtainment and the calculation, at least when the second image stream is received for a first time after the instruction to synchronize is obtained.

4. The receiver apparatus according to claim 3, wherein the circuitry is configured to generate the criterion time based on a time reference value comprised in the first image stream.

5. The receiver apparatus according to claim 4, wherein a first time code is comprised in a front picture of each group of picture (GOP) of the first image stream, and a second time code is comprised in each picture of the second image stream.

6. The receiver apparatus according to claim 1, wherein presentation time information is comprised in the first image stream and the second image stream, and
the circuitry is configured to:
decode the first image stream such that the first image stream is to be presented at a timing when the presentation time information comprised in the first image stream coincides with the adjusted criterion time, and
decode the second image stream such that the second image stream is to be presented at a timing when the presentation time information comprised in the second image stream coincides with the adjusted criterion time.

7. The receiver apparatus according to claim 1, wherein the network is an internet network.

8. The receiver apparatus according to claim 1, wherein the first image stream corresponds to a first view associated with an object and the second image stream corresponds to at least a second view associated with the object.

9. The receiver apparatus according to claim 1, wherein the first image stream includes lower resolution images and the second image stream includes high frequency components corresponding to the lower resolution images.

10. The receiver apparatus according to claim 1, wherein the first image stream includes first language data and the second image stream includes second language data different from the first language data.

11. The receiver apparatus according to claim 1, wherein the receiver apparatus includes a display configured to display the decoded first image stream and the decoded second image stream in synchronization with the first image stream.

12. A reception method, comprising:
receiving, by circuitry, a first image stream from a broadcast transmission, a first time code being comprised in each first unit of the first image stream and decoding the first image stream based on a criterion time;
obtaining, by the circuitry, an instruction to synchronize the first image stream with a second image stream via a network, a second time code being comprised in at least each first unit of the second image stream;
upon obtaining the instruction to synchronize, obtaining, by the circuitry, a first time code received in the received first image stream after the instruction to synchronize is obtained and a second time code received in the second image stream after the instruction to synchronize is obtained, and calculating an amount of delay of the obtained corresponding second time code behind the obtained first time code;
adjusting, by the circuitry, the criterion time based on the amount of delay; and
pausing decoding of the first image stream when the instruction to synchronize is obtained until the adjusted criterion time is reached and, when the adjusted criterion time is reached, resuming decoding the first image stream and beginning to decode the second image stream in synchronization with the first image stream, wherein
the obtained first time code is a chronologically first time code included in the first image stream after the instruction to synchronize is obtained, and
the obtained second time code is a chronologically first time code included in the second image stream after the instruction to synchronize is obtained.

13. The reception method according to claim 12, further comprising:
after the criterion time is adjusted, supplying, by the circuitry, the obtained first time code; and
decoding, by the circuitry, a first unit of the second image stream, the obtained second time code being the same as the supplied first time code.

14. The reception method according to claim 12, further comprising:
after the criterion time is adjusted, decoding, by the circuitry, the received first image stream such that the first image stream is to be presented at a timing when presentation time information comprised in the first image stream coincides with the adjusted criterion time; and
after the criterion time is adjusted, decoding, by the circuitry, the received second image stream such that the second image stream is to be presented at a timing when presentation time information comprised in the second image stream coincides with the adjusted criterion time.

15. The reception method according to claim 12, wherein presentation time information is comprised in the first image stream, and
the method further comprises
decoding the first image stream such that the first image stream is to be presented at a timing when the presentation time information comprised in the first image stream coincides with the adjusted criterion time,
decoding the second image stream,
supplying the obtained first time code, and
decoding a first unit of the second image stream, the obtained second time code being the same as the supplied first time code.

16. The reception method according to claim 12, wherein the obtaining and the calculating are performed at least when the second image stream is received for a first time after the instruction to synchronize is obtained.

17. The reception method according to claim 12, further comprising
generating the criterion time based on a time reference value comprised in the first image stream.

18. The reception method according to claim 12, wherein a first time code is comprised in a front picture of each group of picture (GOP) of the first image stream, and
a second time code is comprised in each picture of the second image stream.

19. The reception method according to claim 12, wherein the network is an internet network.

20. The reception method according to claim 12, further comprising displaying the decoded first image stream and the decoded second image stream in synchronization with the first image stream.

* * * * *